United States Patent [19]
Miks et al.

[11] Patent Number: 5,645,219
[45] Date of Patent: Jul. 8, 1997

[54] ADDITION-POLYMERIZATION RESIN SYSTEMS FOR FIBER-REINFORCED NOZZLE ABLATIVE COMPONENTS

[75] Inventors: Michael W. Miks, North Ogden; John K. Shigley, Ogden, both of Utah

[73] Assignee: Thiokol Corporation, Ogden, Utah

[21] Appl. No.: 101,227

[22] Filed: Aug. 3, 1993

[51] Int. Cl.$^6$ .................. B63H 11/00; B64D 33/04
[52] U.S. Cl. .................. 239/265.11; 428/36.4; 428/34.5; 428/902; 428/402; 428/408; 442/72; 442/178; 442/179; 442/180
[58] Field of Search .................. 428/36.4, 34.5, 428/283, 902, 402, 408; 239/265.11

[56] References Cited

U.S. PATENT DOCUMENTS

| | | | |
|---|---|---|---|
| 4,369,297 | 1/1983 | Bilow | 526/284 |
| 4,439,590 | 3/1984 | Hanson | 526/285 |
| 4,443,566 | 4/1984 | Ying | 523/205 |
| 4,665,246 | 5/1987 | Anderson | 585/320 |
| 4,769,197 | 9/1988 | Kromrey | 264/136 |
| 4,831,086 | 5/1989 | Das et al. | 525/504 |
| 4,851,279 | 7/1989 | Das et al. | 428/224 |
| 4,920,159 | 4/1990 | Das et al. | 523/153 |
| 4,970,276 | 11/1990 | Das et al. | 525/504 |
| 4,978,727 | 12/1990 | Das et al. | 525/504 |
| 4,997,991 | 3/1991 | Carosino et al. | 585/319 |
| 5,024,860 | 6/1991 | Chang | 427/230 |
| 5,247,060 | 9/1993 | Keller | 528/362 |

*Primary Examiner*—Paul J. Thibodeau
*Assistant Examiner*—Mary Critharis
*Attorney, Agent, or Firm*—Ronald L. Lyons; Madson & Metcalf

[57] ABSTRACT

The addition polymerization resin systems phthalonitrile, diethynyldiphenyl methane, phenolic triazine, and polyphosphazene are disclosed as the matrix constituent in fiber-reinforced ablative nozzle components. Various types of fibers such as carbon fibers, preferably rayon and polyacrylonitrile (PAN) based, graphite fibers, glass fibers, ceramic fibers, and silica fibers may be used in the nozzle composite materials. Fillers, such as carbon black, ground silica, ground petroleum coke, and microballoons, may also be included in the ablative nozzle components. The fiber-reinforced ablative nozzle components include from about 20% to about 40% resin, by weight, from about 45% to about 60% fiber, by weight, and when present, from about 3% to about 15% filler, by weight.

30 Claims, 1 Drawing Sheet

ADDITION-POLYMERIZATION RESIN SYSTEMS FOR FIBER-REINFORCED NOZZLE ABLATIVE COMPONENTS

BACKGROUND OF THE INVENTION

1. Field of the Invention

This invention relates to solid rocket motor nozzle ablative composites. More specifically, the present invention relates to the application of addition-polymerization resin systems as the matrix constituent in fiber-reinforced ablative components.

2. Technology Review

The combustion of a solid propellant in a rocket motor creates a hostile environment characterized by extremely high temperature, pressure, mass flows, and turbulent flow. The flame temperature within the motor often exceeds 6,000° F. Pressure within the motor typically exceeds 1,000 psi. Gas velocities typically range from Mach 0.02 in the inlet region to Mach 10+ at the aft end of the rocket motor nozzle. This environment is particularly hostile in a solid rocket motor because its combustion gas typically contains chemical species and particulates which tend to physically and chemically erode exposed rocket motor nozzle components. While the combustion of the rocket propellant is typically brief (i.e., less than sixty seconds), the conditions described above can destroy insufficiently protected or inferior rocket motor nozzles prematurely and jeopardize the mission of the motor.

Parts of a rocket nozzle which are exposed to the high temperatures, pressures, and erosive flow conditions generated by the burning propellant must be protected by an ablative layer of insulation. Various materials have been tried as ablatives, such as silica dioxide, glass, or carbon fiber reinforced phenolics, but reinforced resin composite materials are most commonly used in the severe environment of the nozzle. The reinforced resin composite materials are typically prepared by taking squares or plies of resin impregnated carbon or graphite cloth and positioning them in the desired ply orientation. The nozzle component is manufactured by press-molding, hand lay-up, or tape-wrapping techniques. Tape wrapping using woven cloth prepreg is by far the most common method used for large solid rocket motor (SRM) nozzles. Phenolic resins, such as phenol-formaldehyde resin, are widely used because of their heat resistance, good insulation properties, low cost, and ease of handling and manufacturing.

Despite use for almost 50 years, significant disadvantages remain with phenolic resin systems. For example, phenolic resin systems are a condensation polymerization resin system, that is, they generate volatile by-products, such as water, during cure. These by-products must be removed through vacuum and other means during cure. If the by-products are not adequately removed, low density indications (LDI) in the final ablative nozzle component may result. A LDI in the nozzle component is often caused by resin pockets or pockets of condensation products.

The manufacture of ablative composites for rocket nozzles using phenolic impregnated fiber reinforcement (carbon, graphite, silica, and others) includes extensive inspection of the manufactured components. The evaluation of the components involves very careful visual inspection of the surfaces of every part for any sign of a defect. Very costly (capital and operating) nondestructive evaluation (NDE) methods are also used to characterize the morphology and structure of the entire component. These techniques include X-ray, computed tomography, ultrasonic, electrical resistivity, and other methods developed to find specific types of flaws (i.e., delaminations). These inspections are very labor intensive and significantly increase the cost of manufacturing the ablative composites. If detected during product inspection, a LDI or other defect may lead to rejection and replacement of the nozzle component. Time and materials are wasted, and the overall cost of manufacturing the rocket motor is increased.

If a LDI or other defect is not detected, there is the potential for problems or failure during actual rocket motor firing. Entrapped volatiles can cause pore pressure build-up during motor operation and possibly produce anomalies such as wedge-out, ply lift, sub-char ply separations and pocketing. These anomalies, if severe enough, could significantly affect rocket motor performance.

It will be appreciated that there is a need in the art for fiber-reinforced nozzle ablative compositions which avoid the generation of condensation polymerization by-products, can be easily manufactured without entrapping volatiles within the nozzle ablative composition using conventional manufacturing methods, and do not affect performance detrimentally.

Such fiber-reinforced nozzle ablative compositions are disclosed and claimed herein.

SUMMARY OF THE INVENTION

The present invention is directed to addition polymerization resin systems as the matrix constituent in fiber-reinforced ablative nozzle components. Addition polymerization resin systems do not produce volatile by-products during the polymerization process like condensation polymerization resin systems. Thus, composite nozzle components can be fabricated without voids created by cure products by using an addition polymerization resin system. This may reduce the required cure pressure and eliminate the need for degassing the composite material (i.e., vacuum during processing). It is believed the elimination of entrapped volatiles through use of addition polymerization resins will reduce pore pressure build-up during motor operation and will reduce anomalies such as wedge-out, ply lift, sub-char ply separations, and pocketing.

An important advantage of using the resin systems of the present invention is that alternative processing techniques may optionally be used. Such alternative processing techniques include resin transfer molding and oven cure with the application of pressure through a heat-shrinking tape wrapped around the component. Use of these alternate processing techniques can potentially reduce processing costs, cycle time, and improve component integrity and reliability.

The addition polymerization resin systems contemplated in the present invention include phthalonitrile (PHTH), diethynyldiphenyl methane (DEDPM), phenolic triazine (PT), and polyphosphazene (PZ). Various types of fibers may be used with the addition polymerization resin systems according to the present invention such as carbon fibers, preferably rayon and polyacrylonitrile (PAN) precursors, graphite fibers, glass fibers, ceramic fibers, and silica fibers. Fillers, such as carbon black, ground graphite, ground petroleum coke (green or calcined), ground silica, and microballoons, may also be included in the ablative nozzle components.

The fiber-reinforced ablative nozzle components preferably include from about 20% to about 35% resin, by weight, from about 45% to about 60% fiber, by weight, and when present, from about 3% to about 15% filler, by weight. When resin transfer molding processing is used, the amount of resin may be up to about 40%, by weight.

DETAILED DESCRIPTION OF THE INVENTION

Figure 1:
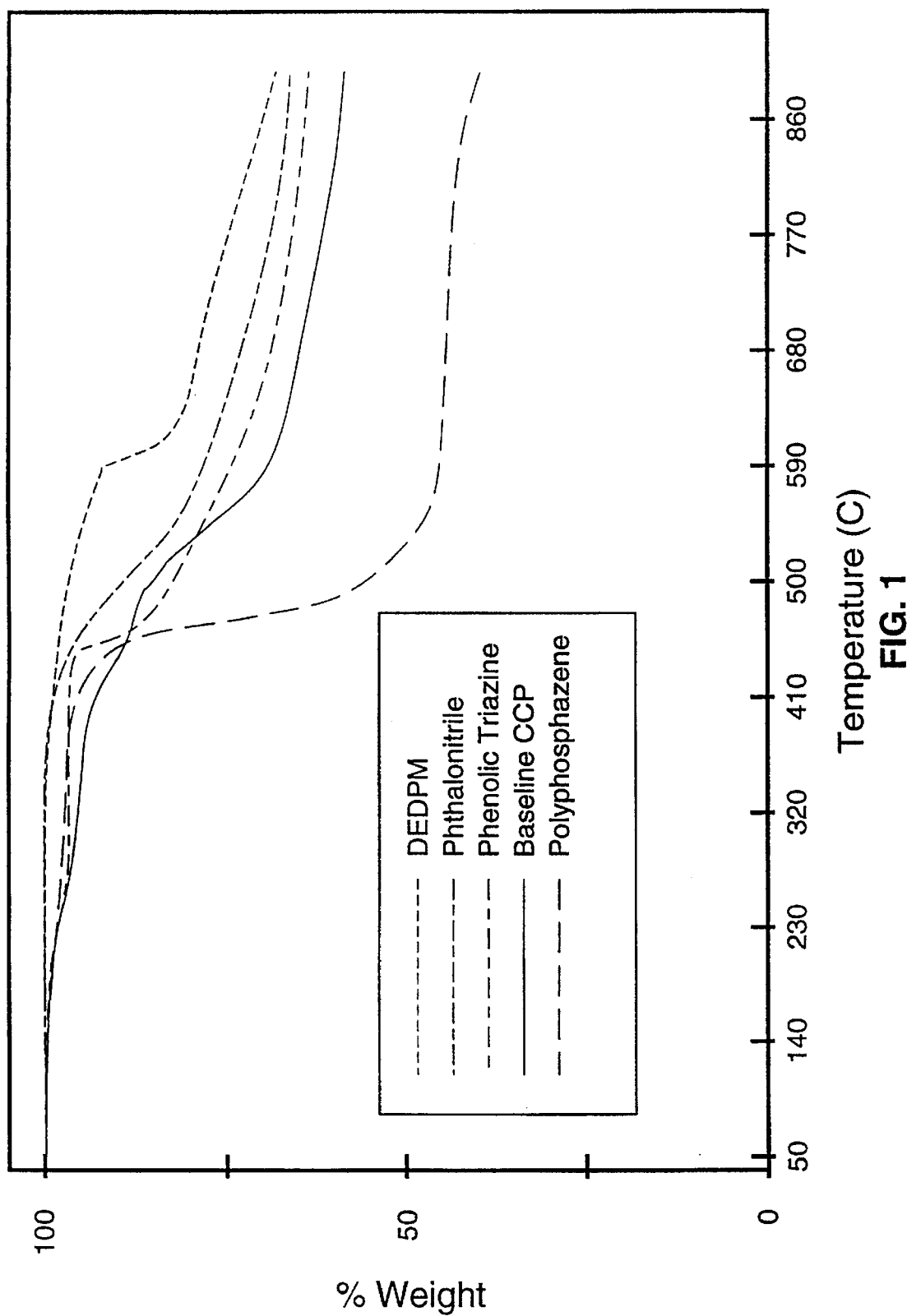
FIG. 1 is a graphical comparison of the thermogravimetric profile in a flowing $N_2$ atmosphere of various cured neat resin systems of the present invention. Samples were heated at a rate of 20° C. per minute.

The present invention is directed to addition polymerization resin systems as the matrix constituent in fiber-reinforced ablative nozzle components. Addition polymerization resin systems, as contrasted with condensation polymerization resin systems, do not produce volatile by-products during the polymerization process. Thus, composite nozzle components prepared from addition polymerization resin systems described herein can be fabricated without voids, potentially reducing the required cure pressure. Degassing of the composite, which causes processing complications with phenolic resins, is unnecessary with the addition polymerization resin systems of the present invention. Elimination of entrapped volatiles according to the present invention will reduce pore pressure build-up during motor operation and possibly reduce anomalies such as wedge-out, ply lift, sub-char ply separations, and pocketing in the nozzle components during motor operation.

Another important benefit of the present invention is the higher and more stable char yields. Typical phenolics have a char yield of 50 to 55 weight percent, while the resin systems of the present invention, with the exception of polyphosphazene, are all at or above 65 weight percent. The higher char yield aids in ablation/erosion resistance and produces a post-fired component with a high char integrity.

Thermogravimetric testing of cured neat resin samples was performed in a flowing nitrogen atmosphere at a heating rate of 20° C./minute from ambient temperature to approximately 900° C. The results of the thermogravimetric tests are illustrated graphically in FIG. 1. The char yield was established as the amount of material remaining at the upper temperature limit. The onset of mass loss and char yield data are reported in Table 1.

TABLE 1

Thermogravimetric Analysis

| Material | Char Yield (wt %) | Onset of Mass Loss (°C.) |
|---|---|---|
| Phenolic triazine (PT) | 62.9 | 460 |
| Diethynyldiphenyl methane (DEDPM) | 67.3 | 590 |
| Phthalonitrile (PHTH) | 65.2 | 500 |
| Polyphosphazene (PZ) | 39.1 | 500 |
| Carbon Cloth Phenolic (CCP) | 57.8 | 365 |

Table 2, below, summarizes various material properties of the addition polymerization resin systems of the present invention.

TABLE 2

Material Properties

| Material | Uncured Specific Gravity | Melting Point (°F.) | Viscosity |
|---|---|---|---|
| PT | 1.24–1.28 | 113–130 | 80 cP @ 250° F. |
| DEDPM | 1.02 | 180–190 | 50–100 cP @ 200° F. |
| PHTH | 1.5 | 466 | 200–300 cP @ 590° F. |
| PZ | 1.25 | 125 | 5000–7500 cP @ 150° F. |
| CCP | 1.09 | N/A | 180–500 cP @ 80° F. |

The resin systems herein also have cured resin densities approximately 10% lower than standard phenolic resins which reduces overall system weight and increases rocket motor performance and payload capacity.

In addition to processing the resin systems by conventional techniques, such as autoclave, hydroclave, and presscure, the resin systems of the present invention permit the use of alternate processing techniques such as resin transfer molding and oven cure with the application of pressure through a heat-shrinking tape wrapped around the component. Such alternate processing techniques can potentially reduce processing costs, cycle time, and improve component integrity and reliability.

The addition polymerization resin systems contemplated in the present invention include phthalonitrile (PHTH), diethynyldiphenyl methane (DEDPM), phenolic triazine (PT), and polyphosphazene (PZ). Typical chemical structures of these resin systems are shown below:

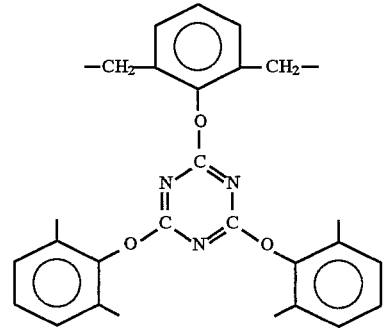

Phenolic triazine (PT)

Phenolic triazine resins may be obtained from Allied-Signal Inc under the tradename Primaset®. Various phenolic triazine resin systems and materials prepared from phenolic triazine resin systems are disclosed in U.S. Pat. Nos. 4,831, 086, 4,851,279, 4,920,159, 4,970,276, and 4,978,727, all to Das et al. and assigned to Allied-Signal Inc., Morris Township, N.J.

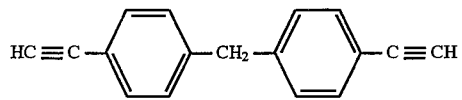

Diethynyldiphenyl Methane (DEDPM)

Diethynyldiphenyl methane (DEDPM) polyaryl acetylene is obtained commercially from ChemBiochem Research, Inc. as a dry powder. Although a conventional prepreg may be prepared by melting the powdered resin, a dry impregnation processing technique has been demonstrated to avoid possible contamination and variability in the material system (i.e., powder coating).

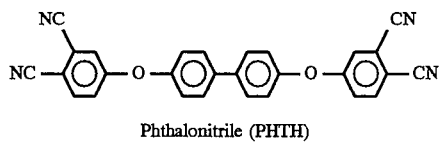

Phthalonitrile (PHTH)

The phthalonitrile resin system was developed by the Naval Research Laboratory and is based on a polymer produced commercially by Cardolite Corporation. This resin may be used in conventional tape-wrapping and compression molding processes, as well as resin transfer molding applications. The tape wrapping and compression molding would involve impregnating the desired woven cloth fibers with the filled or unfilled system. It has been found that prepregging the cloth fibers is efficiently accomplished by first sizing the material with a 1 percent solution of the resin prior to prepregging. The sizing appears to facilitate fiber wetting. The prepreg resin content is preferably in the range from about 26 to about 35 weight percent.

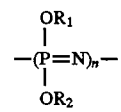

Polyphosphazene (PZ)

Polyphosphazenes are high temperature, flame resistant polymers having inorganic backbones consisting of alternating nitrogen and phosphorus atoms, joined by alternating single and double bonds. In the general structure shown above, $R_1$ and $R_2$ are a hydrocarbon or substituted hydrocarbon, and n is typically from about 20,000 to about 50,000. It is believed that the phosphorous-nitrogen backbone enhances performance due to the inherent flame retardance in the material. In one currently preferred polyphosphazene polymer, obtained from Ethyl Corporation and shown below, $R_1$ is phenyl and $R_2$ is 3-ethylphenyl.

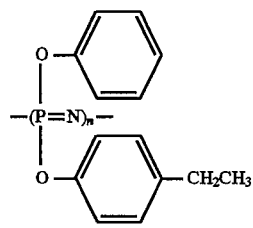

Polyphosphazenes have previously been evaluated as a case insulation material with relatively low fiber content, but their use as an ablative material with a fiber content 100% higher than case insulation is unknown. The difficulties involved in prepregging polyphosphazene were overcome by using a solvent-aided impregnation technique which produced a uniform, well-coated prepreg.

Several different fibers may be used with the addition polymerization resin systems according to the present invention such as carbon fibers, preferably, but not limited to, rayon and polyacrylonitrile (PAN) precursors, graphite fibers, glass fibers, ceramic fibers, and silica fibers. Fillers, such as carbon black, ground graphite, ground petroleum coke (green or calcined), ground silica, and microballoons, may also be included in the ablative nozzle components.

The fiber-reinforced ablative nozzle components preferably include from about 20% to about 35% resin (by weight), from about 45% to about 60% fiber (by weight), and when present, from about 3% to about 15% filler (by weight). When resin transfer molding processing is used, then the amount of resin may be up to about 40% (by weight).

The following examples are offered to further illustrate the present invention. These examples are intended to be purely exemplary and should not be viewed as a limitation on any claimed embodiment.

EXAMPLE 1

Phenolic Triazine (PT)

A carbon fiber-reinforced nozzle ablative material, based on a phenolic triazine resin system, was fabricated as a blast tube and test fired. Hitco CCA-3, a rayon-based carbon cloth with an 8 harness satin weave, 1 ply, 1650 Denier, with 52 yarns/inch warp and 51 yarns/inch fill, was prepregged with phenolic triazine (Allied-Signal Inc.) by YLA, Incorporated and supplied as 12 inch wide broadgoods. Fabrication of the blast tube billet was accomplished through press molding the prepreg while gradually increasing the temperature and pressure. The phenolic triazine composite was cured at lower temperatures and slower ramp rates to inhibit the material from producing a large exotherm. The material was preheated at 270° F. in an oven for one hour prior to cure in the press. Table 3 presents the cure schedule for the blast tube billet.

TABLE 3

| Phenolic Triazine Cure Schedule | | | |
|---|---|---|---|
| Temp. (°F.) | Pressure (psi) | Ramp Rate (°F./min.) | Hold Duration (minutes) |
| 270 | Contact | — | 30 |
| 300 | 140 | 2 | 15 |
| 325 | 280 | 2 | 30 |
| 350 | 420 | 2 | 30 |
| 400 | 560 | 2 | 420 |
| Cool-Down 150 | 560 | 2 | — |

The blast tube billet was fabricated with a 90 degree-to-centerline ply orientation and molded in two sections. The 3 inch diameter billet was machined into the blast tube configuration such that it would fit into the blast tube section of a forty pound propellant charge (FPC) rocket motor nozzle.

The FPC was fired utilizing RSRM (space shuttle) solid propellant with a typical average pressure of 700 psi, a flame temperature of about 6000° R., and a burn time of approximately 33 seconds. Average erosion rates for the phenolic triazine material were 7.9 mils/sec forward and 8.3 mils/sec aft in the blast tube section. Char depths were typical of standard carbon cloth phenolic materials at an average of 0.31 inches. The eroded surface appeared smooth and free of pitting and spalling. Anomalous erosion patterns developed at the bondline, with a significant reduction in the char and erosion values apparent at this point. The anomalous erosion at the bondline was due to increased erosion of the adhesive in the bondline, not because of a property of the phenolic triazine composite.

EXAMPLE 2

Diethynyldiphenyl methane (DEDPM)

A carbon fiber-reinforced nozzle ablative material, based on a diethynyldiphenyl methane resin system, was fabricated as a blast tube and test fired. The resin was provided by ChemBiochem Research, Inc. in dry powder form. The blast tube billet was fabricated using a dry impregnation processing technique. Equal weights of the carbon cloth, Hitco CCA-3, described above, and resin were laid-up in a 3-inch diameter mold in layers of 10 cloth plies for every 10 grams of resin. The lay-up continued until all of the material was loaded into the mold. The material was then staged at 250° F. for 20 hours in the mold before pressure was applied to the system. The material was cured at 310° F. for 10 hours under a pressure of 500 psi. The cured billet was uniform in resin flow and displayed no visual anomalies. Tag end test results show that the material achieved a density of 1.26 gm/cc which is 93% of theoretical density. The blast tube billet was fabricated with a 90 degree-to-centerline ply orientation and molded in two sections. The 3 inch diameter billet was machined into the blast tube configuration such that it would fit into the blast tube section of a forty pound charge (FPC) rocket motor nozzle.

The FPC was fired utilizing RSRM (space shuttle) solid propellant with a typical average pressure of 700 psi and a burn time of approximately 33 seconds. The diethynyldiphenyl methane composite eroded evenly throughout the blast tube. Erosion rates averaged 6.5 mils/sec for the forward end and 7.5 mils/sec for the aft end of the blast tube. These erosion rates are comparable to the erosion performance of typical carbon cloth phenolics. The charred surface displayed no spalling, pitting, or other anomalies. The char depth at the aft end of the test section encompassed the entire section thickness. It is believed the 90 degree ply angle and the location of the graphite throat adjacent to the test material provided the means for the increased char depth in the aft end of the test section.

EXAMPLE 3

Phthalonitrile (PHTH)

A carbon fiber-reinforced nozzle ablative material, based on a phthalonitrile resin system, was fabricated. The resin was provided by Cardolite Corporation. Prepregging of rayon-based carbon cloth, Hitco CCA-3, described above, was efficiently accomplished by first sizing the material with a 1 percent solution of the resin and then impregnating with the resin. The sizing appears to facilitate fiber wetting. The prepreg resin content was about 30 weight percent.

The cured phthalonitrile nozzle composite material was subjected to a plasma torch for ten seconds at a 1-inch stand-off distance. The flame was normal to the sample surface. 70,000 watts input power was used with the plasma torch. The mass loss of the phthalonitrile material was 3.3%, by weight. The mass loss of baseline phenolic was 4.2%, by weight. The initial sample size used in the plasma torch test was 1 inch ×1 inch×2 inches.

By way of comparison, plasma torch tests conducted on a sample prepared from phenolic triazine and rayon-based carbon cloth, Hitco CCA-3, described above, at a 90° ply orientation to centerline, had a mass loss of 5.49 weight percent. Plasma torch tests conducted on a sample prepared from DEDPM and rayon-based carbon cloth, CCA-3, at a 0° ply orientation, had a mass loss of 3.88.

EXAMPLE 4

Polyphosphazene (PZ)

A carbon fiber-reinforced nozzle ablative material, based on a polyphosphazene resin system, was fabricated as a blast tube and test fired. The resin was provided by Ethyl Corporation and had the following structure:

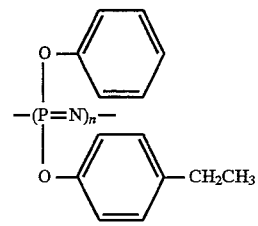

Solvent-aided impregnation was used to produce a uniform, well-coated prepreg with rayon-based carbon cloth (Hitco CCA-3, 8 harness satin weave). Fabrication of the blast tube billet was accomplished through press molding the prepreg at 1000° F. The cure temperature was increased from ambient to 305° F. as a rate of 10° F./minute and held at 305° F. for 30 minutes. The temperature was then increased to 350° F. at a rate of 5° F./minute. The material was cooled, under pressure to a temperature below 160° F. The blast tube billet was fabricated with a 90 degree-to-centerline ply orientation and molded in two sections. The 3 inch diameter billet was machined into the blast tube configuration such that it would fit into the blast tube section of a forty pound charge (FPC) rocket motor nozzle.

The FPC was fired utilizing RSRM (space shuttle) solid propellant with a typical average pressure of 700 psi and a burn time of approximately 33 seconds. The average erosion rate for the polyphosphazene material was 7.9 mils/sec. The char depth was an average of 0.40 inches.

Table 4 summarizes the forty-pound charge motor results for Examples 1–4.

TABLE 4

| | PT | DEDPM | PHTH | PZ | CCP* |
|---|---|---|---|---|---|
| Composite Density, gm/cc | 1.26 | 1.26 | 1.34 | 1.39 | 1.45 |
| Resin Content, wt-% | 32 | — | 30 | 34 | 34 |
| Material Affected Depth, in. | 0.76 | 0.77 | — | 0.40 | 0.56 |
| Char Thickness, in. | 0.43 | 0.53 | — | 0.26 | 0.34 |
| Erosion Rate, mils/sec | 8.6 | 6.4 | — | 7.0 | 6.0 |

*CCP is a standard, rayon-based carbon cloth phenolic.

From the foregoing it will be appreciated that the present invention provides fiber-reinforced nozzle ablative compositions which avoid the generation of condensation polymerization by-products and which can be easily manufactured without entrapping volatiles within the nozzle ablative composition.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fiber-reinforced ablative rocket motor nozzle comprising:
    a phthalonitrile resin, present in the nozzle composite material from about 20% to about 40% by weight;
    a fiber reinforcement present in the nozzle composite material from about 45% to about 65% by weight; and a filler present in the nozzle composite material from about 3% to about 15% by weight;

wherein the nozzle composite material is ablative at solid rocket propellant flame temperatures.

2. A fiber-reinforced ablative nozzle as defined in claim 1, wherein the fiber reinforcement is a carbon fiber.

3. A fiber-reinforced ablative nozzle as defined in claim 2, wherein the fiber reinforcement is a rayon carbon fiber.

4. A fiber-reinforced ablative nozzle as defined in claim 2, wherein the fiber reinforcement is polyacrylonitrile (PAN) carbon fiber.

5. A fiber-reinforced ablative nozzle as defined in claim 1, wherein the fiber reinforcement is a graphite fiber.

6. A fiber-reinforced ablative nozzle as defined in claim 5, wherein the fiber reinforcement is a rayon graphite fiber.

7. A fiber-reinforced ablative nozzle as defined in claim 5, wherein the fiber reinforcement is polyacrylonitrile (PAN) graphite fiber.

8. A fiber-reinforced ablative nozzle as defined in claim 1, wherein the fiber reinforcement is a glass fiber.

9. A fiber-reinforced ablative nozzle as defined in claim 1, wherein the fiber reinforcement is a silica fiber.

10. A fiber-reinforced ablative nozzle as defined in claim 1, wherein the fiber reinforcement is a ceramic fiber.

11. A fiber-reinforced ablative nozzle as defined in claim 1, wherein the filler is carbon black.

12. A fiber-reinforced ablative nozzle as defined in claim 1, wherein the filler is ground silica.

13. A fiber-reinforced ablative nozzle as defined in claim 1, wherein the filler is microballoons.

14. A fiber-reinforced ablative nozzle as defined in claim 1, wherein the filler is ground petroleum coke.

15. A fiber-reinforced ablative nozzle as defined in claim 1, wherein the phthalonitrile resin is present in the nozzle composite material from about 25% to about 35% by weight.

16. A fiber-reinforced ablative rocket motor nozzle comprising:

a diethynyldiphenyl methane resin, present in the nozzle composite material from about 20% to about 40% by weight;

a fiber reinforcement present in the nozzle composite material from about 45% to about 65% by weight; and a filler present in the nozzle composite material from about 3% to about 15% by weight;

wherein the nozzle composite material is ablative at solid rocket propellant flame temperatures.

17. A fiber-reinforced ablative nozzle as defined in claim 16, wherein the fiber reinforcement is a carbon fiber.

18. A fiber-reinforced ablative nozzle as defined in claim 17, wherein the fiber reinforcement is based carbon fiber.

19. A fiber-reinforced ablative nozzle as defined in claim 17, wherein the fiber reinforcement is polyacrylonitrile (PAN) carbon fiber.

20. A fiber-reinforced ablative nozzle as defined in claim 16, wherein the diethynyldiphenyl methane resin is present in the nozzle composite material from about 25% to about 35% by weight.

21. A fiber-reinforced ablative rocket motor nozzle comprising:

a phenolic triazine resin, present in the nozzle composite material from about 20% to about 40% by weight;

a fiber reinforcement present in the nozzle composite material from about 45% to about 65% by weight; and a filler present in the nozzle composite material from about 3% to about 15% by weight;

wherein the nozzle composite material is ablative at solid rocket propellant flame temperatures.

22. A fiber-reinforced ablative nozzle as defined in claim 21, wherein the fiber reinforcement is a carbon fiber.

23. A fiber-reinforced ablative nozzle as defined in claim 22, wherein the fiber reinforcement is rayon carbon fiber.

24. A fiber-reinforced ablative nozzle as defined in claim 22, wherein the fiber reinforcement is polyacrylonitrile (PAN) carbon fiber.

25. A fiber-reinforced ablative nozzle as defined in claim 21, wherein the phenolic triazine resin is present in the nozzle composite material from about to about 35% by weight.

26. A fiber-reinforced ablative rocket motor nozzle comprising:

a polyphosphazene resin, present in the nozzle composite material from about 20% to about 40% by weight;

a fiber reinforcement present in the nozzle composite material from about 45% to about 65% by weight; and a filler present in the nozzle composite material from about 3% to about 15% by weight;

wherein the nozzle composite material is ablative at solid rocket propellant flame temperatures.

27. A fiber-reinforced ablative nozzle as defined in claim 26, wherein the fiber reinforcement is a carbon fiber.

28. A fiber-reinforced ablative nozzle as defined in claim 27, wherein the fiber reinforcement is rayon carbon fiber.

29. A fiber-reinforced ablative nozzle as defined in claim 27, wherein the fiber reinforcement is polyacrylonitrile (PAN) carbon fiber.

30. A fiber-reinforced ablative nozzle as defined in claim 26, wherein the polyphosphazene resin is present in the nozzle composite material from about 25% to about 35% by weight.

* * * * *